United States Patent Office 2,766,400
Patented Oct. 9, 1956

2,766,400

METHODS AND APPARATUS FOR OSCILLOSCOPICALLY DISPLAYING A PLURALITY OF SIGNALS

Calvin M. Clark, Fullerton, and Stanley W. Martin, Sherman Oaks, Calif., assignors to California Research Corporation, San Francisco, Calif., a corporation of Delaware Application June 13, 1955, Serial No. 514,999

9 Claims. (Cl. 315—24)

This invention relates in general to methods of and apparatus for sampling a plurality of signals and relates more specifically to the sequential and progressive sampling of a plurality of signals to produce indications of the amplitude of the signals for use in an oscilloscopic display, in multiplexing or in other similar operations.

In the simultaneous or rapid sequential display of a plurality of different but related signals upon an oscilloscope or other related display medium, it is often desirable to intercompare the variation of these signals with respect to time or some other common independent variable. For example, in the seismic prospecting art, the seismic waves generated by an explosion or other suitable source of seismic energy are picked up by a plurality of receptors or geophones arranged in known spatial relationships to the point of explosion. The outputs of the different geophones, corresponding to the seismic energy received at the geophones by reflection, refraction or diffraction of the original seismic energy, are recorded as a plurality of traces or tracks recorded side by side on a reproducible recording device. The reproducible recording medium may be photographic, electrostatic, or magnetic, and serves to produce a record of the received seismic energy which may be reproduced repeatedly and at will. The reproducible record so obtained may be played back and the data contained therein analyzed by suitable means such as oscilloscopic display.

In such oscilloscopic display, it is preferable that the signals be substantially simultaneously presented as an aid in intercomparing the relative magnitudes or other variables of interest in the signals. One of the solutions proposed for simultaneously presenting a plurality of seismic detector signals upon an oscilloscopic display is to use a multigun oscilloscope to produce a plurality of electron beams in the tube. However, this solution is not particularly satisfactory, owing to the complexity and cost of such multigun oscilloscopes. In another proposed system, the different signals from the reproducible recording medium are sequentially reproduced, modified in a predetermined manner and supplied to the oscilloscope, resulting in a sequential tracing of the signals on the oscilloscope display surface. However, this system has the disadvantages that, owing to the limited persistence of the oscilloscope phosphor, there is a considerable variation in brightness among the sequentially traced signals, particularly where there are a considerable number of such signals to be displayed. This system results in a display in which the first signal is barely perceptible at the time of the tracing of the last signal, rendering accurate comparison of the events on the different signals difficult. In another of such systems, the signals are sampled through an electronic arrangement utilizing ring counters to sequentially generate deflection pulses for the oscilloscope. However, this system has the disadvantage of being necessarily rather complex, owing to the large number of vacuum tubes required and the associated maintenance involved.

Broadly, the present invention contemplates methods and apparatus for oscilloscopically displaying a plurality of signals on an oscilloscope having a current of predetermined wave form supplied to the vertical deflection means in which a different reference signal is added to each of the signals of interest to produce a plurality of boundary signals and the vertical deflection current is sampled to produce a comparator signal with which the boundary signals are continuously and progressively compared through pairs of diodes. This comparison produces a pulse for gating a cathode ray beam each time the amplitude of the comparator signal equals the amplitude of one of the boundary signals, and the cathode ray beam is deflected across the display surface in synchronism with the gating of the beam to trace out the signals on the display surface.

More particularly, the present invention contemplates the use of a vertical deflection current having a substantially triangular wave form and the sampling of the current to produce a comparator signal of triangular wave form with a maximum amplitude greater than the amplitude of the largest of the boundary signals and with a minimum amplitude less than the amplitude of the smallest of the boundary signals. All of the boundary signals are effectively connected in parallel and the comparator voltage is applied to each of the boundary signals through a pair of diodes or half-wave rectifiers having imperfect characteristics; that is, the rectifiers are preferably selected so as to have a low back-to-front resistance, so that when two of such rectifiers are connected serially in opposite directions they act as a substantially constant current device for voltages of either polarity. The comparator voltage has a frequency high enough to produce a sufficient number of scannings of each of the signals of interest so that a representative sampling is obtained. Through the use of the triangular comparator signal obtained by sampling the triangular vertical deflection current, exact synchronization of the comparator operation and the vertical deflection of the beam is assured.

It is, therefore, an object of the present invention to provide improved methods and apparatus for oscilloscopically displaying a plurality of interrelated signals.

It is a further object of the present invention to provide methods and apparatus for oscilloscopically displaying a plurality of interrelated signals, in which a reference signal is added to each of the interrelated signals to produce a plurality of boundary signals which are compared in amplitude with a comparator signal obtained by sampling the vertical deflection current of the oscilloscope to produce a pulse for gating the cathode ray beam in synchronism with its deflection each time the amplitude of the comparator signal equals the amplitude of one of the boundary signals.

It is an additional object of the present invention to provide methods and apparatus for oscilloscopically displaying a plurality of interrelated signals on an oscilloscope having a current of triangular wave form flowing in the vertical deflection means in which a reference signal is added to each of the interrelated signals to produce a plurality of boundary signals which are compared in amplitude with a comparator signal obtained by sampling the vertical deflection current to produce a pulse for gating the cathode ray beam in synchronism with its deflection each time the amplitude of the comparator signal equals the amplitude of one of the boundary signals.

Objects and advantages other than those set forth above will be readily apparent from the following description, when read in connection with the accompanying drawings, in which:

Fig. 2 is a series of graphs (Figs. 2A, 2B, 2C, 2D)

illustrating the principles of operations of the present invention;

Figure 1:
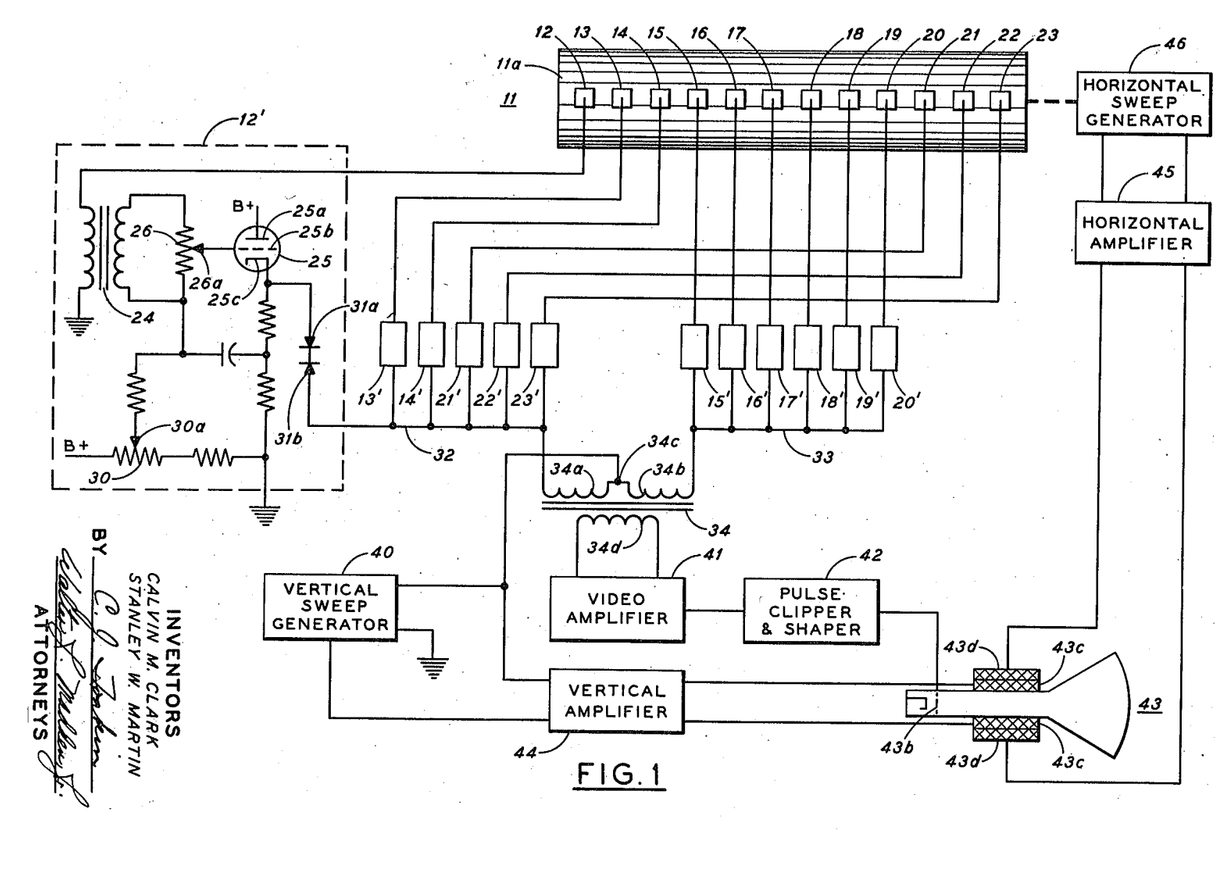
Fig. 1 diagrammatically illustrates one embodiment utilized in connection with the sampling and the oscilloscopic display of a plurality of seismic detector signals.

In the following description, it is assumed that the present invention is to be utilized in the sampling and oscilloscopic display of a plurality of seismic detector signals, but it will be apparent that the invention is equally applicable to other types of time modulation operations. In Fig. 1, reference numeral 11 designates generally a reproducible recording device on which the seismic detector signals can be recorded and subsequently reproduced repeatedly and at will. As is well known in the art, such reproducible recording medium may be photographic, electrostatic or magnetic, and in the embodiment illustrated in Fig. 1, it is assumed that device 11 comprises a magnetizable recording medium 11a, such as a layer of magnetizable material disposed about the periphery of a rotating element, on which the seismic signals are recorded. Recorder 11 is provided with means for recording and reproducing the different signals from recording medium 11a, and as shown in Fig. 1, such means may be a plurality of recording-reproducing heads 12, 13, 14, 15, 16, 17, 18, 19, 20, 21, 22, and 23. It is assumed that heads 12 through 23 perform the double functions of both recording and reproducing the signals for their associated channels, but it will be obvious to those skilled in the art that separate recording and reproducing heads may be provided for each channel if desired.

Heads 12 through 23 are arranged in side-by-side relationship along the longitudinal axis of recording medium 11a and overlie the respective channels on which the different seismic signals are recorded. Each of heads 12 through 23 may also be movable about the periphery of medium 11a to effect relative time shifts in the heads along the time axis of the associated channels or signals. In operation, it will be understood that recording medium 11a rotates beneath heads 12 through 23 during the recording and reproduction operation.

After recording the signals on recording medium 11a, they may be reproduced through heads 12 through 23 and be supplied to the display apparatus. Each of the different seismic detector signals for reproducing heads 12 through 23 is supplied to an associated network where a different reference signal is combined with each of the seismic signals. One such network is shown in Fig. 1 connected to reproducing head 12, and such a network may comprise a transformer 24 having a primary winding connected to head 12, and a secondary winding connected to the input circuit of a vacuum tube 25 having a grid 25b and a cathode 25c. The secondary winding of transformer 24 is connected across a resistor 26 having an adjustable tap 26a connected to grid 25b. The lower terminal of the secondary winding of transformer 24 is connected through a resistor to the adjustable tap 30a of a resistor 30 which has one terminal connected to a regulated power supply. Resistor 30 and the regulated power supply thus form means for introducing an adjustable reference signal or voltage into the grid circuit of tube 25 for combination with the seismic detector signal. Cathode 25c is connected to ground through a pair of resistors, and is also connected to a suitable selectively conductive element such as a pair of half-wave rectifiers 31a and 31b. Rectifiers 31a and 31b are connected back-to-back, as shown in the drawing, and may be of any suitable type, such as germanium diodes. Diodes 31a and 31b are preferably selected so as to have a rather poor front-to-back resistance, so that each rectifier permits some current to flow in what would normally be the reverse direction for that rectifier. Diodes 31a and 31b are connected to a common conductor 32, which is in turn connected to one of the terminals of one-half 34a of the primary winding of a transformer 34 having another half primary winding 34b, a center tap 34c and a secondary winding 34d.

As shown by the dotted enclosure designated by reference character 12', tube 25, resistors 26 and 30, transformer 24, and rectifiers 31a and 31b form means for adding a reference signal to the seismic detector signal to produce a boundary signal which is applied to one side of diodes 31a and 31b for comparing this boundary signal with the amplitude of the time-varying comparator signal. Networks similar to network 12' are provided for each of the other seismic signals in their associated channels, and such networks have not been shown in detail but are designated by reference characters 13', 14', 15', 16', 17', 18', 19', 20', 21', 22', and 23'. In this connection it will be noted that networks 12', 13', and 14', together with networks 21', 22', and 23', are connected in common to conductor 32 and the half 34a of the primary winding transformer 34, while networks 15' through 20' are connected through a common conductor 33 to the other half 34b of the primary winding of transformer 34.

The center tap 34c of the primary winding of transformer 34 is connected to the output of a suitable device for generating the cyclic comparator signal with which the boundary signals are compared. Such a generator may be of any type capable of generating a time-varying signal within the desired limits, such as one which produces a symmetrical trapezoidal wave either by combining different wave forms or by inverting alternate cycles of a conventional saw-tooth wave. Preferably, however, a generator 40 is utilized which produces a triangular output wave having a minimum amplitude which is less than the minimum amplitude of the smallest boundary signal and having a maximum amplitude which is in excess of the amplitude of the largest of the boundary signals. This triangular signal is also preferably generated at a suitably high rate, such as a frequency of 2000 cycles per second, to insure representative sampling of each of the seismic detector signals.

The secondary winding 34d of transformer 34 is connected to a video amplifier 41 for amplifying the voltage pulses from transformer 34. The output of video amplifier 41 is supplied to a pulse clipper and shaper network 42 which clips and sharpens the pulses from amplifier 41. The output from network 42 is impressed on the grid 43b of a cathode ray tube 43 on which the signals are to be oscilloscopically displayed. The pulses supplied to grid 43b from network 42 serve to gate the cathode ray beam on and off in accordance with their times of occurrence. Cathode ray tube 43 is also provided with a pair of vertical deflection yokes 43c and a pair of horizontal deflection yokes 43d. The sweep signal to vertical deflection yokes 43c, which signal is synchronized with and substantially identical to the comparator signal, is supplied through a vertical sweep amplifier 44 from sweep generator 40. The input to vertical sweep amplifier 44 comprises a triangular wave signal identical to that which is supplied to midtap 34c of transformer 34, plus a square wave signal generated separately by sweep generator 40. These two wave forms are combined to produce a trapezoidal wave form input to vertical deflection yokes 43c. This trapezoidal wave form is required for the vertical deflection yokes since, owing to the inductance of yokes 43c, the current therein lags the voltage thereacross, so that to produce a truly triangular wave form of current through the yokes a voltage of trapezoidal wave form is required.

Horizontal deflection yokes 43d are supplied with a suitable horizontal sweep voltage through a horizontal amplifier 45 from a horizontal sweep generator 46. As shown by the dotted line, horizontal sweep generator 46 is preferably synchronized with recorder 11 so that the output of sweep generator 46 bears an adjustable, predeterminable relationship to the rotative position of recorder 11.

In operation, assuming that the seismic detector signals have been recorded on recording medium 11a and that it is now desired to simultaneously reproduce and display these signals on tube 43, the operation of the embodiment illustrated in Fig. 1 is as follows: The amplitude level of each of the seismic detector signals is adjusted through positioning in networks 12' through 23' of the taps of the resistors corresponding to resistor 26 in network 12'. The magnitudes of the reference voltages which are to be combined with each of the seismic signals are adjusted by adjustment in networks 12' through 23' of the resistors corresponding to resistor 30 in network 12'. Each of these reference voltages so introduced is different, so that the zero axis of each of the seismic signals is effectively displaced from that of the others. The reference signals may be thought of as vertical position bias signals which serve to displace the seismic detector signals vertically from each other to permit simultaneous display of the detector signals.

Figure 2A:
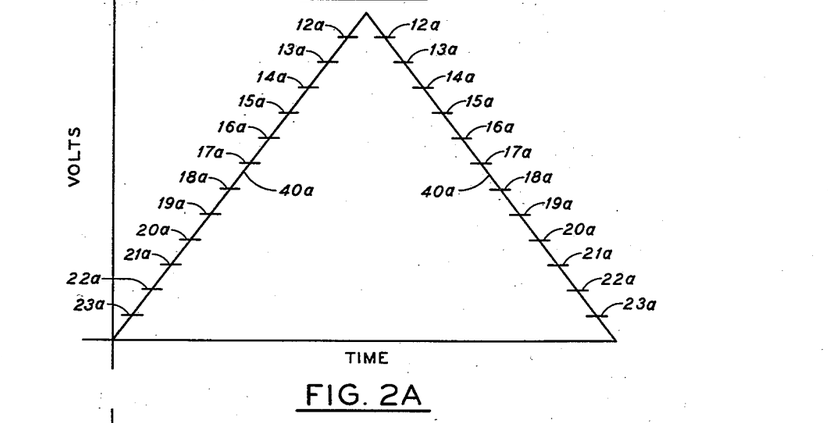

The operation of the present invention may be more readily understood with the aid of graphs shown in Figs. 2A through 2D. In Fig. 2A, triangular curve or graph 40a represents the triangular wave output from generator 40, plotted as a function of time. Lines or marks 23a through 12a represent the magnitudes of the different reference signals or voltages to which the seismic detector signals are added to form the boundary signals. It will be seen that the reference voltages increase in magnitude from a minimum amplitude for the reference signal corresponding to the detector signal on channel 23 to a maximum value for the reference signal corresponding to the detector signal on channel 12. It will also be seen that the minimum amplitude of curve 40a, corresponding to the triangular signal from generator 40, is less than the amplitude of the reference signal for channel 23, which is the smallest of the reference signals, and further, that the maximum amplitude of curve 40a is greater than the amplitude of the reference signal for channel 12, which is the largest of the reference signals.

It should be noted that reference levels 12a through 23a in Fig. 2A correspond to the magnitudes of the reference signals alone, and that the amplitudes of the different seismic detector signals are combined with the associated reference signal amplitudes to form the boundary signals. Thus, each of the reference signals should be separated from the adjacent reference signal or signals by an amount or bandwidth sufficient to permit the seismic detector signals to be combined with the different reference signals without any overlapping or interference in the amplitudes of adjacent boundary signals.

Figure 2B:
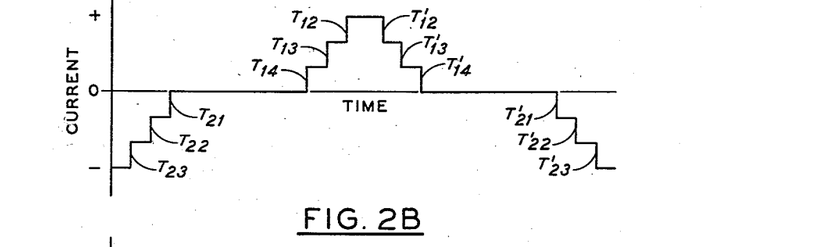

The operation of the embodiment illustrated in Fig. 1 can perhaps best be understood by considering the operation when the reference signals alone are utilized without the seismic detector signals being added thereto, the reference signals thus also corresponding to the boundary signals in this assumed method of operation. Assuming that vertical sweep generator 40 is just at the beginning of its cycle, before the amplitude of its triangular comparator signal equals the amplitude of the smallest of the boundary signals, the polarities of the voltages in the comparator circuit are such that a current flows from each of the boundary generating units 12' through 23'. For units 12', 13', 14', 21', 22', and 23', the current flows through conductor 32 and winding 34a to midtap 34c. For units 15' through 20', the current flows through conductor 33 and winding 34b to center tap 34c. These current flows may be termed negative current flows, and are plotted in Figs. 2B and 2C as functions of time, Fig. 2B representing the current flow through the half 34a of transformer 34, and Fig. 2C representing the current flow through the half 34b of transformer 34.

As mentioned above, diodes 31a and 31b are so chosen as to have poor current blocking characteristics in their reverse direction; that is, each of the diodes conducts a substantial amount of current in the direction opposite to its poling. I have found that diodes can be chosen such that a pair of them connected in the manner shown in the drawing act as a substantially constant current device over a wide range of voltages of either polarity applied thereacross. For a voltage of a given polarity and of magnitudes less than the breakdown voltage, the current through the pair of diodes is substantially constant. When the voltage closely approaches or reaches zero, the diodes act as a switch to momentarily halt the current flow, and then the current reverses and increases to substantially the same magnitude in the opposite direction as the voltage thereacross increases in the opposite direction. The pair of diodes so connected thus act as a switch to produce a step of current in response to a change in the polarity of the voltage thereacross. A single diode could be utilized in place of the pair of diodes shown in the drawing, but the use of such a single diode has the disadvantage that there is no tendency to limit the current flow in the forward direction of the diode.

When the voltage represented by curve 40a reaches the level of line 23a, corresponding to the reference or boundary level for channel 23, the voltage across the diodes of channel 23 is reversed to abruptly reverse the current flow through network 23'. This reversal of current flow through network 23' reduces the total current flow through winding 34a and produces a step in the current at time $T_{23}$, as shown in Fig. 2B. The current through winding 34a then continues at this reduced value until the comparator voltage represented by curve 40a reaches the threshhold voltage of channel 22 at time $T_{22}$. At this instant the current flow through unit 22' reverses to produce another step decrease in the total current flow through winding 34a. The amplitude of the voltage represented by curve 40a continues to increase to reach the threshhold level of channel 21 at time $T_{21}$ and decrease the current flow through winding 34a to zero.

Figure 2C:
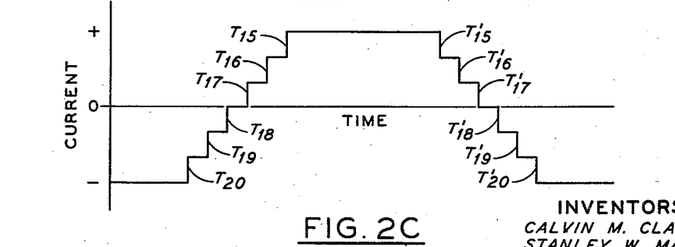

During the preceding increase of the voltage represented by curve 40a to the threshhold values of channels 23, 22, and 21, the current flow through the other half 34b of the primary winding of transformer 34 remains substantially constant at its maximum negative value, as shown in Fig. 2C, since the comparator voltage has not as yet equalled the threshhold values of any of the channels connected to winding 34b. The current pulses through winding 34a resulting from the above-described step decreases in current therethrough are differentiated by the action of transformer 34 to produce in secondary winding 34d a voltage pulse for each of the current steps in winding 34a. These voltage pulses for networks 23', 22', and 21' are shown in Fig. 2D at times $T_{23}$, $T_{22}$, and $T_{21}$, and are shown as having a positive polarity.

The comparator voltage 40a next increases to successively equal the amplitudes of the boundary signals of channels 20, 19, 18, 17, 16, and 15. Since these channels are all connected to winding 34b, this increase of the comparator voltage produces a series of current steps through winding 34b, as shown in Fig. 2C, the current increasing in six steps from a maximum negative value to a maximum positive value. Since this current flow is opposite in direction to that through winding 34a, the voltage pulses produced across secondary winding 34d are of a negative polarity, as shown by voltage pulses $T_{20}$, $T_{19}$, $T_{18}$, $T_{17}$, $T_{16}$, and $T_{15}$ in Fig. 2D. During this portion of the operation, current through winding 34a is substantially zero, as shown in Fig. 2B.

When the comparator voltage reaches the threshhold of the boundary signal of channel 14, a current step is produced in a positive direction at time $T_{14}$. The current through winding 34a then subsequently increases in steps at times $T_{13}$ and $T_{12}$ as the comparator voltage increases and equals the boundary signals of channel 13 and channel 12. The comparator signal then increases to its maximum value and commences to decrease toward zero. During such decrease, the threshhold levels of each of the different channels are again sequentially passed, starting with channel 12 and progressing through channel 23, to produce another series of current steps through windings 34a and 34b. However, during the decrease of the comparator voltage from its maximum value to zero, the direction of current flow for each of the current steps through windings 34a and 34b is just the opposite of the current direction during the increase of the comparator voltage from zero to its maximum value, so that the voltage pulses across the secondary winding 34d are of the opposite polarity, as shown in Fig. 2D.

Figure 2D:
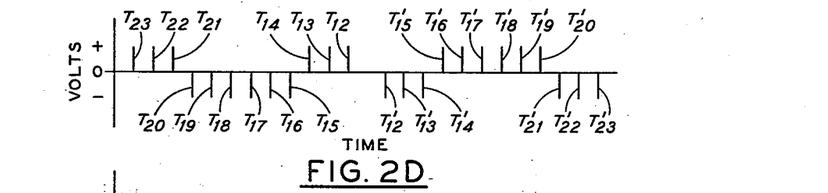

A plot of the voltage pulses supplied to video amplifier 41 and network 42 would thus appear as shown in Fig. 2D, with a series of pulses consisting of positive pulses $T_{23}$, $T_{22}$, $T_{21}$; six negative pulses $T_{20}$, $T_{19}$, $T_{18}$, $T_{17}$, $T_{16}$, and $T_{15}$; three positive pulses $T_{14}$, $T_{13}$, and $T_{12}$; three negative pulses $T'_{12}$, $T'_{13}$, and $T'_{14}$; six positive pulses $T'_{15}$ through $T'_{20}$; and three negative pulses $T'_{21}$, $T'_{22}$, and $T'_{23}$. These pulses are supplied to clipper and shaper network 42 where the negative pulses are eliminated and the positive pulses are amplified, sharpened and supplied as gating pulses to grid 43b of cathode ray tube 43. Thus, gating pulses are supplied to grid 43b at the following times and in the following sequence during a cycle of the comparator signal: $T_{23}$, $T_{22}$, $T_{21}$, $T_{14}$, $T_{13}$, $T_{12}$, $T'_{15}$, $T'_{16}$, $T'_{17}$, $T'_{18}$, $T'_{19}$, and $T'_{20}$.

The electron beam is deflected in synchronism with the gating pulses to effectively trace out the seismic detector signals on the oscilloscopic display surface. Ideally, the deflection current flowing in vertical deflection yokes 43c is identical in wave form and synchronized in time with the comparator signal represented by curve 40a of Fig. 2A, and this synchronism of the vertical deflection with the beam gating provides the desired relationship between the instant of gating of the beam and the vertical position to which the beam is deflected at that instant. That is, the synchronization of the comparator signal with the vertical deflection signal converts the seismic detector signals from an amplitude basis to a time basis for the oscilloscopic display. The horizontal sweep supplied to horizontal deflection yokes 43d is preferably generated as a function of the rotative position of recording medium 11a, so that the period of the horizontal sweep will correspond to the period of rotation, or a portion thereof, of recording medium 11a.

The display presented by the present invention may perhaps be best visualized in connection with Fig. 2A and by considering that the deflection signal applied to vertical deflection yokes 43c is identical in wave form to and is synchronized in time with the comparator signal shown by curve 40a. Assuming that the cathode ray beam is located at the lower left-hand corner of the cathode ray tube display surface when the vertical deflection voltage is zero and the horizontal deflection voltage is zero, the scanning and display operation would be as follows: As the current flowing in the vertical deflection yokes increases from zero in the triangular manner shown by curve 40a, the beam would be deflected vertically on the tube face. However, the beam is off at this time, since no gating impulse is supplied through network 42 and therefore no trace appears on the display surface.

At time $T_{23}$, the first gating impulse is supplied to grid 43b to gate on the electron beam. Since the vertical deflection component has a magnitude at this instant corresponding to the magnitude of point 23a on curve 40a, the gated beam is positioned vertically on the display surface at a point corresponding to this deflection component to produce a pulse or dot of light on the display surface. The beam is suppressed after this gating pulse until time $T_{22}$, at which time the beam is again gated on. The vertical deflection component at this instant has a magnitude corresponding to the amplitude of point 22a on curve 40a, so that at the instant of gating by gating pulse $T_{22}$, the beam is vertically positioned on the display surface at a point corresponding to the amplitude of point 22a to produce a pulse or dot of light at this point. Assuming that the frequency of the vertical deflection is considerably in excess of that of the horizontal deflection, the pulse of light produced by gating pulse $T_{22}$ will be disposed on the display surface almost directly above the dot produced by gating pulse $T_{23}$, since the horizontal deflection of the beam during this interval will be very small. The next dot on the display surface will be produced at the time of gating pulse $T_{21}$ and this dot will be displaced vertically from the dots corresponding to gating pulses $T_{23}$ and $T_{22}$.

During the period between times $T_{20}$ and $T_{15}$, no gating pulses are supplied to tube 43 since the pulses produced during this interval are of a negative polarity and are therefore eliminated by network 42. Therefore, no dots are produced on the display surface as the vertical deflection component increases through the range between points 20a and point 14a of curve 40a. When the vertical deflection component has a magnitude corresponding to point 14a of curve 40a, gating pulse $T_{14}$ is produced to produce a dot on the oscilloscope at this instant, and similar dots are produced as subsequent gating pulses $T_{13}$ and $T_{12}$ are produced. The vertical deflection component then reaches its maximum value and commences to decrease toward zero. During this decrease, the threshhold levels of channels 12, 13, and 14 are sequentially passed by the comparator voltage, but this does not produce any gating pulses to tube 43 because these pulses $T'_{12}$, $T'_{13}$, and $T'_{14}$ are of negative polarity. When the positive gating pulse $T'_{15}$ is produced, the vertical deflection component has a magnitude corresponding to the magnitude of point 15a of curve 40a so that the beam is vertically positioned in accordance with this magnitude at the instant of gating by pulse $T'_{15}$. Gating pulses $T'_{16}$, $T'_{17}$, $T'_{18}$, $T'_{19}$, and $T'_{20}$ similarly gate the electron beam at corresponding values of the vertical deflection component to produce a series of vertically spaced dots on the display surface. No gating pulses are produced at times $T'_{21}$, $T'_{22}$, and $T'_{23}$ since the pulses produced at these times are of negative polarity.

Thus, during one cycle of the vertical deflection component, each of the channels has been effectively sampled and an indication produced on the display surface of the magnitude of the sampled signals in each of the channels, with the channel signals displayed in sequence from top to bottom of the display surface. The above-described operation continues for subsequent cycles of the vertical deflection component and the comparator signal, with the beam being deflected horizontally. By suitable choice of the vertical sweep frequency relative to the horizontal sweep frequency and by suitable choice of the oscilloscope phosphor, each of the dots produced during a given scanning may be made to merge with the adjacent dots for the same channel so that the signal for each channel appears to the eye as a solid line.

It will be understood that, for simplicity, in the above description the reference signals were considered without the addition thereto of the detector signals, and that the resultant display in this case would consist of a series of spaced lines across the display surface, since the amplitudes of the reference signals do not change. However, in practice, the seismic detector signals are added to the associated reference signals to produce the variable amplitude boundary signals which are actually sampled. In this case the display would comprise traces of the actual seismic detector signals having mean values displaced from each other by amounts corresponding to the different reference signals.

As mentioned above, the current wave forms supplied to vertical deflection yokes 43c and to transformer 34 from sweep generator 40 are preferably identical to insure exact synchronization of the gating of the beam with its vertical deflection. However, owing to the inductance of yokes 43c, the current therethrough lags the voltage thereacross so that even though the voltage across yokes 43c is identical to that supplied to the midtap of transformer 34, the current through yokes 43c, and hence the deflection of the beam, is not identical with the variation in the comparator voltage. This condition may be improved somewhat, as shown in Fig. 1, by adding a square wave voltage to the triangular voltage, and impressing the resultant trapezoidal voltage on yokes 43c to produce approximate synchronization of the vertical deflection current and the comparator voltage.

Figure 3:
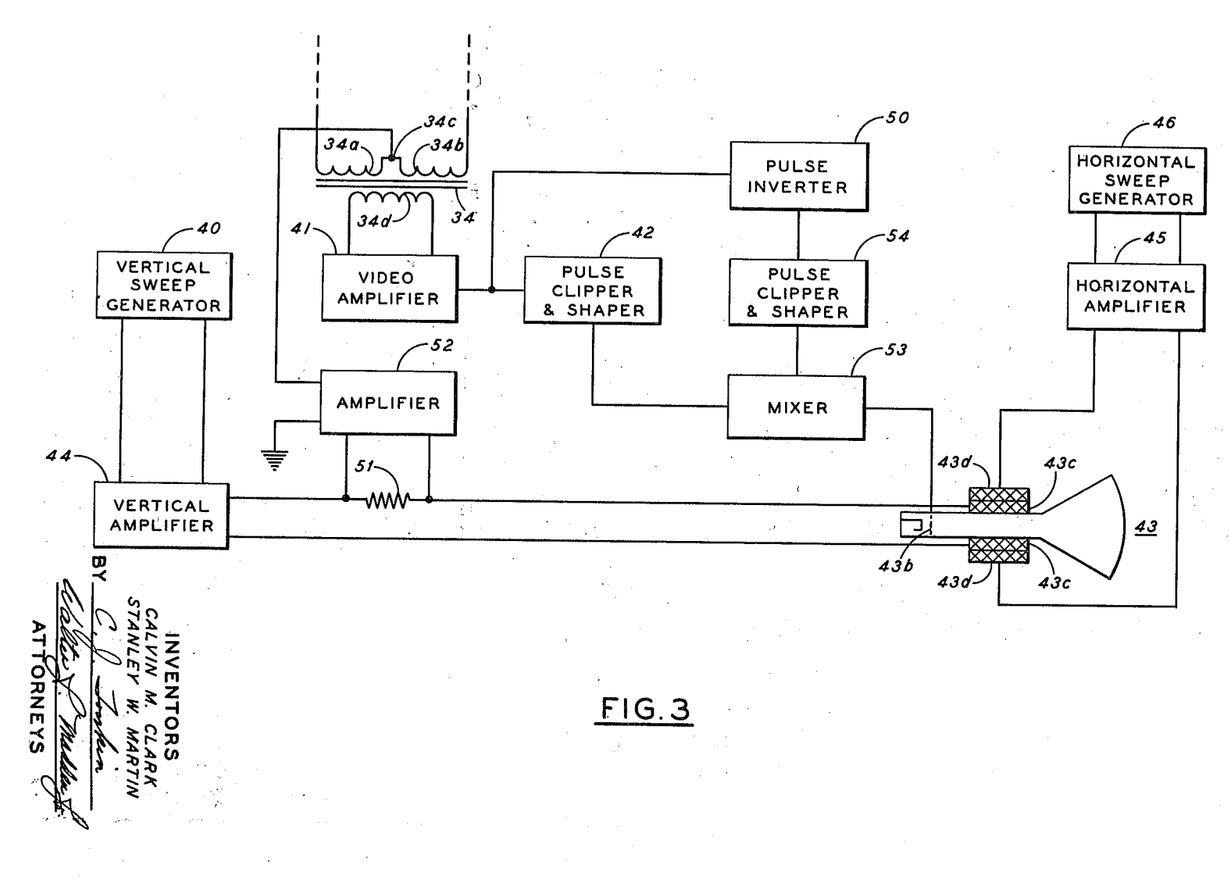
Fig. 3 diagrammatically illustrates one embodiment of the present invention utilizing resistive sampling of the vertical deflection current to obtain the comparator signal.

However, even this does not produce exact synchronism, and makes it necessary to use the sampling method shown in Fig. 1, in which only one-half of the actual samples or current pulses generated are utilized as gating pulses. The use of only one-half of the pulses for each cycle is necessitated by the fact that the vertical deflection component may not be perfectly symmetrical for a given cycle, so that the positions of the dots for each channel would vary between the two half-cycles of the deflection current and result in blurring or overlapping of the displayed traces. In the embodiment of Fig. 3 this condition is remedied by producing exact synchronization of the two quantities in the following manner: The output from vertical sweep generator 40 is supplied directly through vertical amplifier 44 to vertical deflection yokes 43c. This current through yokes 43c is sampled through suitable means such as a resistor 51 placed in series between yokes 43c and vertical amplifier 44. The voltage developed across resistor 51 is supplied to amplifier 52, where it is amplified and supplied to the midtap 34c of the primary winding of transformer 34. The output from amplifier 52 thus forms the comparator voltage which is compared with the boundary signals, and since the output of amplifier 52 is an actual measure of the current flowing through vertical deflection yokes 43c, there is exact synchronization between the current through vertical deflection yokes 43c and the comparator voltage supplied to the midtap of the primary winding of transformer 34.

The output from secondary winding 34c is supplied through video amplifier 41 to the pulse clipper and shaper network 42, as before, and also to an inverter 50 and an additional clipper and shaping network 54. The outputs from networks 42 and 54 are combined in mixer 53 to produce a series of unidirectional pulses. That is, networks 42, 50 and 54 together invert and/or shape all of the pulses so that the whole series of pulses $T_{23}$ through $T_{12}$ is utilizable as gating pulses, and these gating pulses are supplied to the grid 43b of tube 43. The embodiment illustrated in Fig. 3 has the advantages that all of the pulses generated across secondary winding 34c may be utilized as gating pulses, to thus effectively reduce the sampling interval for each channel by one-half and present the traces in a display having increased brilliance.

Figure 4:
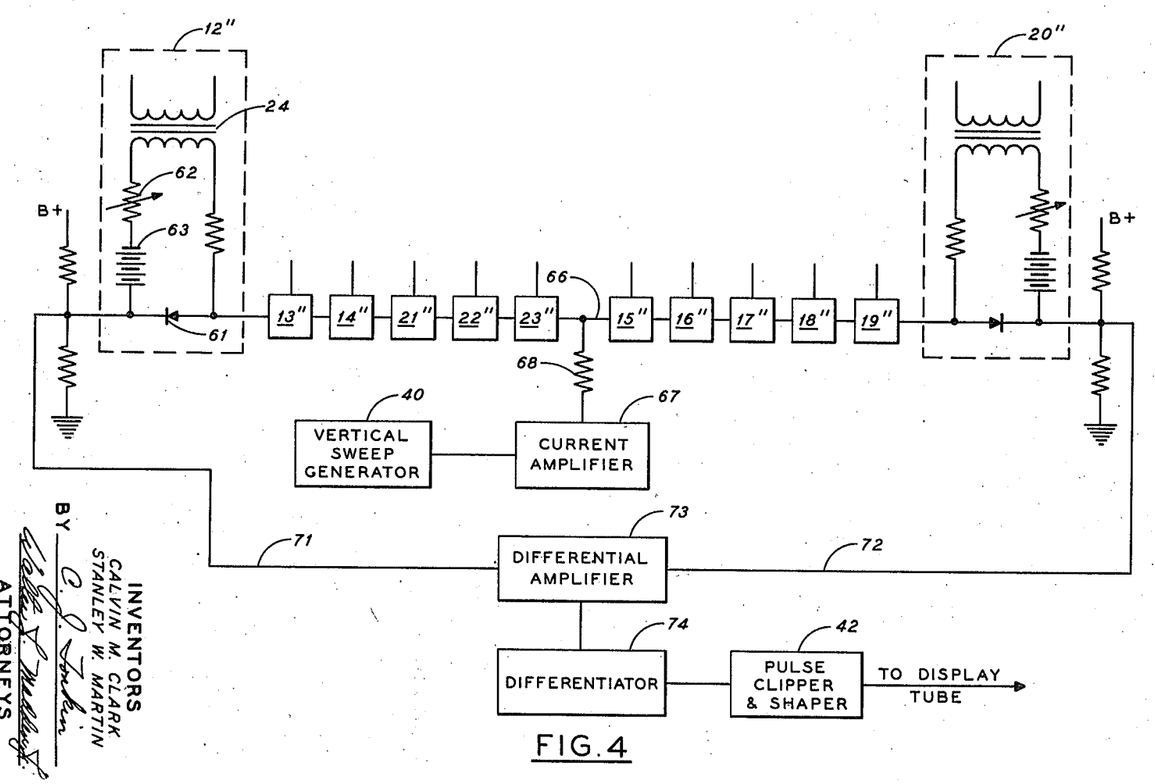
Fig. 4 diagrammatically illustrates a portion of an alternate embodiment utilizing a constant voltage diode network.

In the above-described embodiment, the comparator operation was performed through the use of substantially constant current devices, but the present invention is equally operative utilizing constant voltage devices in the comparator circuits. An arrangement utilizing a representative type of constant voltage network is illustrated in Fig. 4 where reference numeral 24 again designates a transformer connected to recording/reproducing head 12. The secondary winding of transformer 24 is connected across a suitable diode 61 through an adjustable resistor 62 and a source of reference or bias signal represented by a battery 63. Diode 61 is preferably of the silicon junction type, such as the type designated as Retma No. IN200, or its equivalent, and has the property that for current flow through the diode in a given direction and above a minimum value, the voltage across the diode is substantially constant. Battery 63 provides this bias current through diode 61 so that, in the absence of a comparator signal, the voltage across the diode is substantially constant. As shown by the dotted enclosure designated 12'', the elements therein form means for combining the seismic detector signal with a reference signal to form a boundary signal which may be compared with the comparator signal. Similar networks designated 13'' through 23'' are provided for the other channels, it being understood that the magnitudes of the reference or bias signals in these networks are different to provide the different threshhold levels for the associated channels.

Channels 12, 13, 14, 21, 22, and 23 are serially connected together to a junction point 66, and channels 15, 16, 17, 18, 19, and 20 are similarly connected on the opposite side of junction point 66. The comparator signal from vertical sweep generator 40 is supplied through a current amplifier 67 and a resistor 68 to junction 66. The voltage steps resulting from the comparator operation are impressed through a pair of conductors 71 and 72 on a differential amplifier 73 which has its output connected to a differentiating network 74. Differentiator 74 serves to differentiate the steps resulting from the comparator operation to supply corresponding voltage pulses to clipper and shaper network 42. The output from network 42 is a series of gating pulses which is supplied to grid 43b of tube 43 to gate the electron beam thereof.

Assume that the comparator signal has a triangular wave form similar to that represented by curve 40a of Fig. 2 and that this signal is just starting to increase from zero. The bias currents in each of networks 12'' through 23'' are adjusted to different values, each of the values being beyond the minimum current required to produce a constant voltage across each of the associated diodes. It will be understood that the values of the bias currents in the different channels are different and that preferably the bias currents have a relationship similar to those shown by reference marks 23a through 12a of Fig. 2A. Under these conditions, the constant voltages of each of the diodes combine to produce a pair of substantially constant voltages between junction 66 and conductors 71 and 72, respectively. When the current from generator 40 increases to a value sufficient to reduce the current through network 23'' below the current corresponding to the critical value for constant voltage operation, the voltage across the diode in network 23'' abruptly decreases to aproximately zero, thus abruptly decreasing the total voltage between junction 66 and conductor 71. This voltage step is amplified in amplifier 73 and supplied to differentiating network 74 to produce a pulse corresponding to the step. This pulse is clipped and shaped in network 42 and supplied to grid 43b to gate the electron beam, it being understood that the beam is being deflected vertically in synchronism with the comparator signal, as discussed above in connection with Fig. 1.

The comparator current thus continues to increase and subsequently to decrease to successively equal the threshhold values of the different channels and thus produce a series of voltage steps which are converted into gating pulses for the electron beam. The wave forms for the resulting voltage steps and gating pulses will be similar to those shown in Figs. 2B, 2C, and 2D, with the exception that the voltage steps resulting from operations of the embodiment of Fig. 4 will start from a positive maximum and decrease to zero and then increase in steps to the positive maximum, rather than varying between positive and negative maxima as in Fig. 2. Similarly, it will be understood that a pulse inverter could be added in parallel to network 42 and the outputs of network 42 and the inverter combined so that all of the voltage steps could be utilized as gating pulses.

Although the preceding description is related to the use of the present invention in connection with an oscilloscopic display, it will be apparent that the invention may be utilized in connection with a number of other recording or display arrangements, such as spark recorders, electrochemical recorders or various photographic recorders utilizing pulsed beams of light. Additionally, as mentioned above, the present invention is useful in various time modulation operations such as a pulse position and pulse width modulation. For example, in Fig. 2D, the different voltage pulses T23, T22, T21, T20, etc., are equivalent to a pulse position modulation system, the position of the pulses along the time axis being variable in dependence upon the amplitudes of the sampled boundary signals. Similarly, in Figs. 2B and 2C, the different current steps illustrated therein are equivalent to a pulse width modulation system when suitable well known means are provided to convert the steps into pulses along a common time axis. Features disclosed but not claimed herein are claimed in an application of Calvin M. Clark, Serial No. 508,687, filed May 16, 1955.

Although but a few illustrative embodiments of the present invention have been described, it will be apparent to those skilled in the art that various changes and modifications may be made therein without departing from the spirit of the invention or the scope of the appended claims.

We claim:

1. The method of oscilloscopically displaying a plurality of variable amplitude signals on a cathode ray tube having a vertical deflection current of triangular wave form comprising the steps of adding a different position reference signal to each of said signals to form a plurality of boundary signals, sampling said vertical deflection current to obtain a comparator signal having a triangular wave form and synchronized in time with said vertical deflection current, comparing the amplitude of each of said boundary signals through at least one diode with the amplitude of said comparator signal to produce a current step each time the amplitude of said comparator signal equals the amplitude of one of said boundary signals, and gating the cathode ray beam in response to said steps.

2. The method of oscilloscopically displaying a plurality of variable amplitude signals on a cathode ray tube having a vertical deflection current of triangular wave form comprising the steps of adding a different position reference signal to each of said signals to form a plurality of boundary signals, sampling said vertical deflection current to obtain a comparator signal having a triangular wave form and synchronized in time with said vertical deflection current, comparing the amplitude of each of said boundary signals through a pair of diodes with the amplitude of said comparator signal to produce a current step each time the amplitude of said comparator signal equals the amplitude of one of said boundary signals, and gating the cathode ray beam in response to said steps.

3. The method of oscilloscopically displaying a plurality of variable amplitude signals on a cathode ray tube having a vertical deflection current of triangular wave form comprising the steps of adding a different position reference signal to each of said signals to form a plurality of boundary signals, sampling said vertical deflection current to obtain a comparator signal having a triangular wave form and synchronized in time with said vertical deflection current, comparing the amplitude of each of said boundary signals through a pair of diodes with the amplitude of said comparator signal to produce a current step each time the amplitude of said comparator signal equals the amplitude of one of said boundary signals, gating the cathode ray beam in response to said steps, and deflecting said cathode ray beam horizontally of the display surface in a period which is a function of the period of said variable amplitude signals to trace said variable amplitude signals on said display surface.

4. The method of oscilloscopically displaying a plurality of variable amplitude signals on a cathode ray tube having a vertical deflection current of triangular wave form comprising the steps of adding a different position reference signal to each of said signals to form a plurality of boundary signals, sampling said vertical deflection current to obtain a comparator signal having a triangular wave form and synchronized in time with said vertical deflection current, comparing the amplitude of each of said boundary signals through at least one diode with the amplitude of said comparator signal to produce a current step each time the amplitude of said comparator signal equals the amplitude of one of said boundary signals, gating the cathode ray beam in response to said steps and deflecting said cathode ray beam horizontally of the display surface in a period which is a function of the period of said variable amplitude signals to trace said variable amplitude signals on said display surface.

5. The method of oscilloscopically displaying a plurality of variable amplitude signals on a cathode ray tube having a vertical deflection current of predetermined wave form comprising the steps of adding a different position reference signal to each of said signals to form a plurality of boundary signals, sampling said vertical deflection current to obtain a comparator signal having said predetermined wave form and synchronized in time with said vertical deflection current, comparing the amplitude of each of said boundary signals through at least one diode with the amplitude of said comparator signal to produce a current step each time the amplitude of said comparator signal equals the amplitude of one of said boundary signals, gating the cathode ray beam in response to said steps and deflecting said cathode ray beam horizontally of the display surface in a period which is a function of the period of said variable amplitude signals to trace said variable amplitude signals on said display surface.

6. The method of time modulating a plurality of variable amplitude signals as a function of current of predetermined wave form comprising the steps of adding a different position reference signal to each of said signals to form a plurality of boundary signals, sampling said current to obtain a comparator signal having said predetermined wave form and synchronized in time with said current, and comparing the amplitude of each of said boundary signals through at least one diode with the amplitude of said comparator signal to produce a time modulated pulse each time the amplitude of said comparator signal equals the amplitude of one of said boundary signals.

7. Apparatus for oscilloscopically displaying a plurality of variable amplitude seismic signals comprising means for adding a different position reference signal to each of said seismic signals to form a plurality of boundary signals, means for supplying a current of substantially triangular wave form to the vertical deflection means of said oscilloscopic display, means for sampling said current to produce a comparator signal having a wave form and phase substantially identical to said current, means including a pair of diodes for comparing the amplitude of each of said boundary signals with the amplitude of said comparator signal to produce a current step each time the amplitude of said comparator signal equals the amplitude of one of said boundary signals, and means for gating the cathode ray beam of said oscilloscopic display in response to said steps.

8. Apparatus for oscilloscopically displaying a plurality of variable amplitude seismic signals comprising means for adding a different position reference signal to each of said seismic signals to form a plurality of boundary signals, means for supplying a current of substantially triangular wave form to the vertical deflection means of said oscilloscopic display, resistor means connected between said supply means and said vertical deflection means for sampling said current to produce across said resistor means a comparator signal having a wave form and phase substantially identical to said vertical deflection current, means including a pair of diodes for comparing the amplitude of each of said boundary signals with the amplitude of said comparator signal to produce a current step each time the amplitude of said comparator signal equals the amplitude of one of said boundary signals, and means for gating the cathode ray beam of said oscilloscopic display in response to said steps in synchronism with the deflection of said beam.

9. Apparatus for oscilloscopically displaying a plurality of variable amplitude seismic signals comprising means for adding a different position reference signal to each of said seismic signals to form a plurality of boundary signals, means for supplying a current of substantially triangular wave form to the vertical deflection means of said oscilloscopic display, means for sampling said current to produce a comparator signal having a wave form and phase substantially identical to said current, means including at least one diode for comparing the amplitude of each of said boundary signals with the amplitude of said comparator signal to produce a current step each time the amplitude of said comparator signal equals the amplitude of one of said boundary signals, and means for gating the cathode ray beam of said oscilloscopic display in response to said steps in synchronism with the deflection of said beam.

No references cited.